C. R. LENTZ.
CUTTER FOR PASTRY MAKING MACHINES.
APPLICATION FILED AUG. 21, 1919.
1,419,276.
Patented June 13, 1922.
3 SHEETS—SHEET 1.
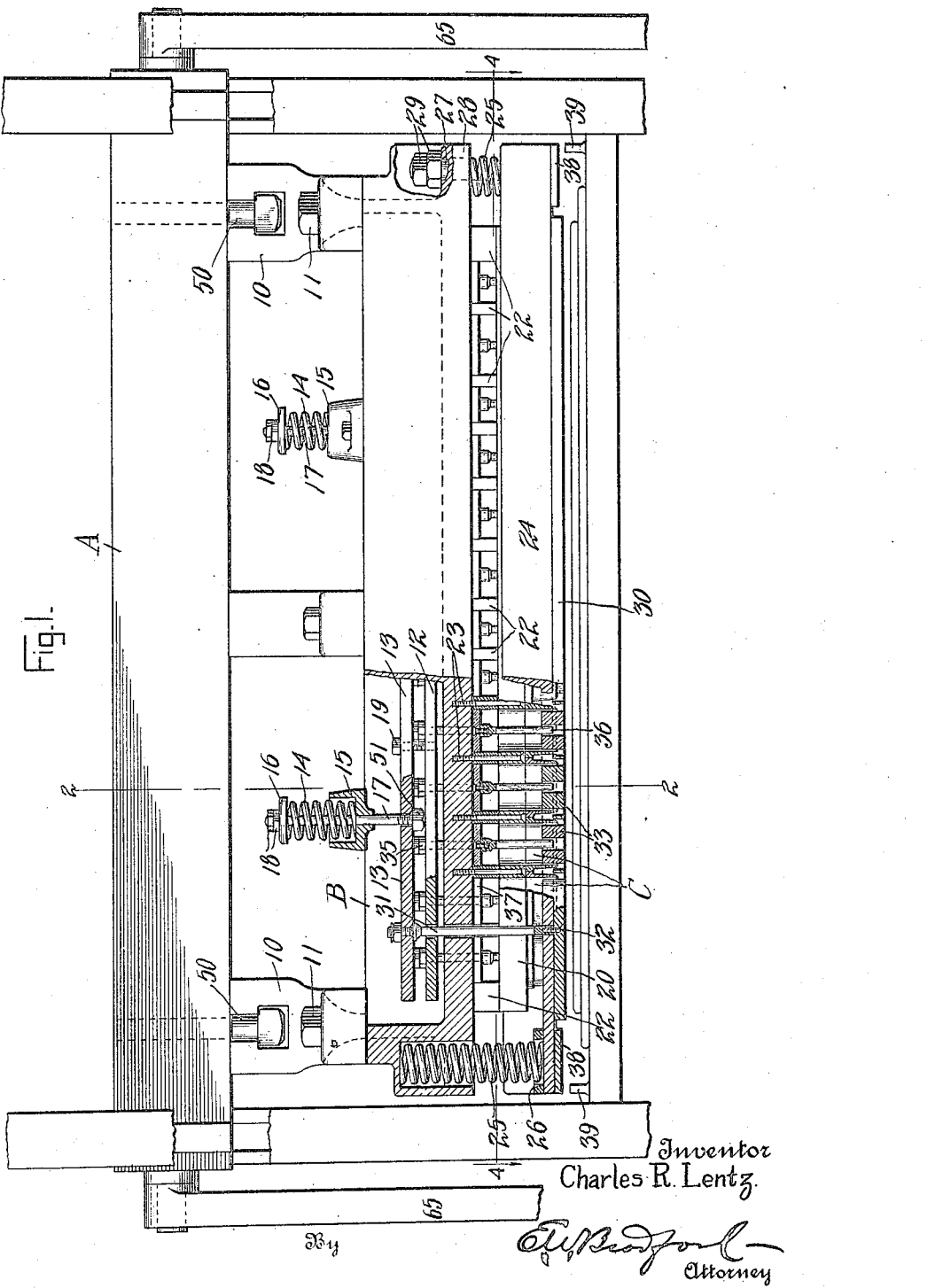
Inventor
Charles R. Lentz.

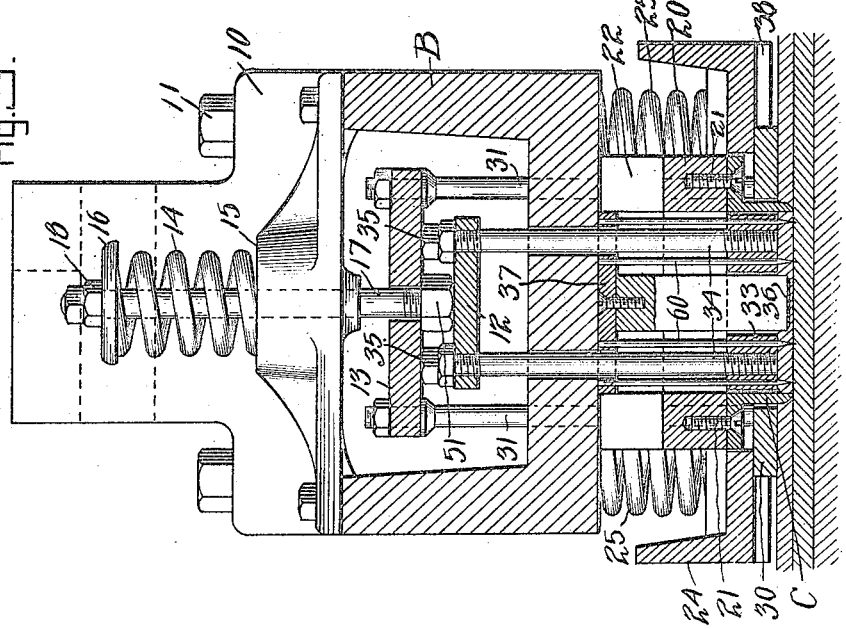

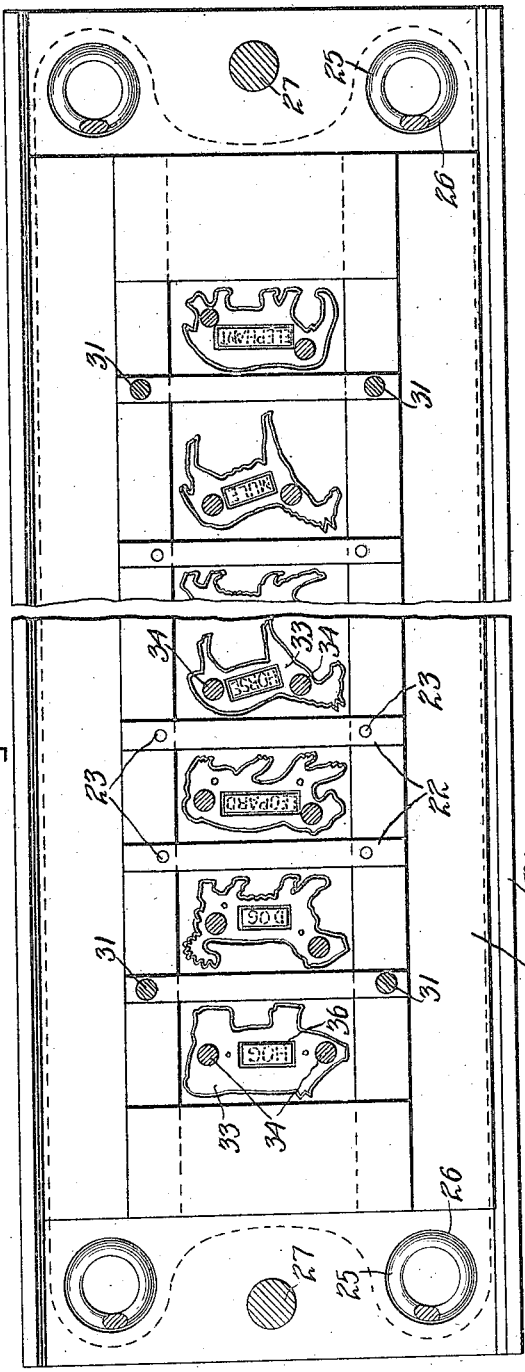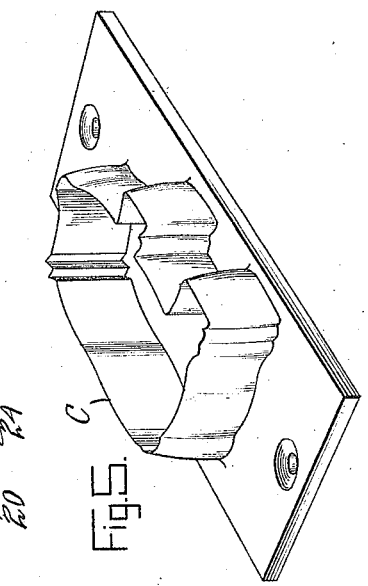

UNITED STATES PATENT OFFICE.

CHARLES R. LENTZ, OF INDIANAPOLIS, INDIANA.

CUTTER FOR PASTRY-MAKING MACHINES.

1,419,276.    Specification of Letters Patent.    Patented June 13, 1922.

Application filed August 21, 1919. Serial No. 319,006.

*To all whom it may concern:*

Be it known that I, CHARLES R. LENTZ, a citizen of the United States, residing at Indianapolis, in the county of Marion and State of Indiana, have invented certain new and useful Improvements in Cutters for Pastry-Making Machines, of which the following is a specification.

My said invention consists in various improvements in the details of construction and arrangement of parts of cutting mechanism for use in pastry machines, such as cracker and cake machines, whereby a more accurate and perfect operation is secured, shallow steel cutters are made possible of use, convenience in keeping the machine clean and free from clogging by dough is provided for, breakage of parts obviated, and in general more perfect results secured, as well as more durable and less expensive construction provided, all as will be hereinafter more fully described and claimed.

Referring to the accompanying drawings which are made a part hereof and on which similar reference characters indicate similar parts, Figure 1 is a view, partly in elevation and partly in section, across the upper portion of a cracker or cake baking machine, showing the cake cutting apparatus to which my invention particularly relates, in the position it occupies when in use, Figure 2, a cross section at a point corresponding to line 2—2 in Figure 1, Figure 3, a view similar to Figure 2, showing the parts in the position they occupy when closed, or when the cutter bar has been depressed the full extent, Figure 4, a horizontal section on the dotted line 4—4 in Figure 1, and Figure 5, a detail view illustrating one of the cutter dies.

In said drawings the portions marked A represent the reciprocating bar of the machine on which the cutter proper is mounted; B the frame carrying the cutters and mechanism for controlling the same, and C the cutters or cups which do the actual cutting of the dough.

The frame B is of rectangular form provided at each end with arches 10 secured thereto by lag-screws or bolts 11 by which the structure is mounted upon and carried by the reciprocating bar A by bolts 50.

Within the frame B is mounted a plunger carrying head consisting of upper and lower plunger plates 12 and 13 which are supported by springs 14 interposed between a cup 15 on the frame B and a flanged disk 16 at the upper end of a rod 17. Said rod 17 passes through a perforation in plate 13 and has a head or nut 51 on its lower end between plates 12 and 13 and has a screw-threaded upper end on which jam nuts 18 are mounted for holding the disk 16 in place. The plates 12 and 13 are clamped together by clamping screws 19 as shown.

The cutters C are rigidly mounted on a cutter carrying bar 20 by means of screws 21 extending through flanges on the outside of said cutters into said bar. Bar 20 is spaced from frame B by cross bars 22 and is secured to be carried by said frame B by screws 23 which extend through said bar 20 through the cross bars 22 and into screw-threaded perforations in said frame. A lower plate 24, preferably formed of channel steel is mounted beneath the frame B and normally held spaced therefrom by springs 25 interposed one at each corner between said plate and said frame, one end of each spring being mounted in a socket in the corner of the frame and the other end within a ring or cup 26 on the top surface of said plate. Said plate 24 is carried by bolts 27 secured at their lower ends in said plate and at their upper ends projecting through perforations in flanges 28 in the ends of said frame B and having stop nuts 29 (preferably jam nuts) on its upper end which serve to limit the distance which said plate is allowed to separate from the frame under the action of springs 25. The lower plate 24 has an opening therein sufficiently large to permit the cutter carrying bar 20 to pass therethrough.

A stripper plate 30 is mounted against the face of plate 24 being carried on the lower end of rods 31 which are secured at their upper ends in plate 13, pass through the lower part of frame B and also through perforations in plate 24 to flush with its lower surface. The plate 30 is secured to said rods 31 by screws 32 which are inserted through perforations therein and into screw perforations of the lower ends of said rods, and has openings sufficiently large to neatly embrace cutters C.

Clearers 33 are mounted on the lower end of rods 34 within each cutter or cup C and the bar 20 is formed with perforations adapted to receive said clearers, the upper end of said rods 34 extending through the bed plate of frame B through perforations in bar 12, and have nuts 35 on their upper ends (preferably jam nuts) which are held in position by bar 13 which is clamped tightly upon said nuts by means of the clamping bolts 19, thus obviating the necessity of reducing the diameter of the rods 34 to provide shoulders near their upper ends as is usual. Said bar 13 thus serves to receive the thrust of the clearers and relieve the rods 34 at their upper ends of the strain incident to the operation and thus avoid breakage which is common in ordinary constructions.

As will be observed, particularly by reference to Figures 1 and 4, the springs 25 are located at the four corners of the cutting device and outside the longitudinal length of the operative part of the cutter but within the lateral width. By this means a very efficient support for the parts is secured without increasing the width and consequently the weight and cost of the parts.

A die 36 carrying the name to be printed upon the top surface of the cake or cracker is mounted centrally within the cutter opening in the bar 20 being carried by a plate 37 secured on the lower face of the frame B. Docker pins 60 are also carried in said plate 37 extending through perforations in the clearers, for the well known purpose.

In operation the frame B carrying the series of cutters, C reciprocates up and down with the bar A of the frame, which is connected to the operating mechanism by connecting bars 65 in the usual manner. At each downward movement a strip of dough of the appropriate thickness is fed to beneath the cutters and a series of cakes or crackers cut therefrom, as follows:

As the frame B approaches the limit of its downward movement stroke, bars 38 on the lower end of bolts 27 contact with the stops 39 on the bed of the frame and limit the downward movement of plate 24 just before it comes in contact with the surface of the dough. Frame B, however, continues its downward movement carrying with it the cutters C, which are formed to cut a cake of the shape desired as indicated in Figure 4, and the docker pins formed to pierce the cakes. The dies 36 within the cutters are carried with the cutters C but as their lower ends do not extend to the lower edges of the cutters it will be understood that they merely make an impression upon the top of the cake, such as imprinting the name or any other configuration desired in order to lend character and shape to the article or thing which the cake is intended to represent. The downward stroke of the frame B being completed the cutters and dies have performed the operation of cutting and imprinting the dough and the frame B starts back on its return movement in an upward direction withdrawing the cutter C and die from said dough. The springs 25, however, having been compressed by the downward movement of the frame B operate to hold plate 24 down during the upward movement of said frame B and parts connected therewith until the nuts 29 of the bolts 27 contact with the upper surface of the ears or flanges 28 of said frame and likewise hold stripper plate 30 and the bar 13 carrying the plungers or clearers 33 stationary above the apron or table until the cutters and dies are withdrawn from contact with the cakes formed thereby. Likewise the plate 30 holds the dough surrounding said cutters. As the frame B moves upward the ears 28 again strike the nuts 29 and raise the plate 24 and the parts attached thereto, the springs 14 at the same time elevating the plate 30 and clearers 33 and permitting another movement of the dough carrying apron one step, when the cutter returns for another operation, and such operations continue in succession indefinitely cutting strip after strip of dough into cakes shaped as may be desired by the cutters and dies. The springs 14 form the sole support for the plunger plates 12 and 13 and the parts associated therewith comprising the stripper plate 30 connected to the plate 13 by the rods 31 and the clearers 33 connected to the plate 12 by rods 34, and as the tension of the springs 14 is always upwards the plate 30 will be held against the bottom face of the plate 24 during the downward movement of the plate 24, and will ascend with the plate 24 until the plate 30 contacts with the flanges at the upper ends of the cutters C. The plate 24 and stripper plate 30 are made separate as it frequently happens that the stroke of the member A varies and in many instances causes the plate 24 to travel a distance above the upper end of the cutter C as in Figure 3.

As the cutters C in this construction are very shallow and at the plate 30 fits more or less closely the outer walls of the cutters and consequently strikes the flanges at the upper edge of the cutters, when moved upwardly a distance relatively thereto it is absolutely essential to form the plates 24 and 30 separate from each other, thus permitting continued upward movement of the plate 24 relatively to the cutters after the plate 30 has stopped and preventing breakage of these parts. By forming the cutters C shallow, as shown, they can be made of steel or similar metal, at a very nominal cost, thus rendering them practically indestructible from use, while if they were extended upward to the frame B it would be practically impossible to construct them of steel owing to the weight and expense of manufacture, and they would have to be constructed of a softer metal and necessarily would not have the same wearing qualities and strength.

Having thus fully described my said invention, what I claim as new and desire to secure by Letters Patent, is:

1. In a cake cutting machine a cutter carrying frame adapted for reciprocatory motion, a cutter fixed to said frame, clearing and stripping means, superposed plunger plates, said clearing and stripping means being bolted to said plunger plates, said plates being bolted together, bolts having one of their ends fixed between said plates cups on said frame, through which said bolts extend, disks at the outer ends of said bolts, and springs surrounding said bolts between said cups and disks for yieldingly supporting said plunger plates and stripping and clearing means.

2. In a cake cutting machine a channel-shaped cutter carrying frame adapted for reciprocatory motion, collars fixed across the top of said frame, a plurality of rigidly connected plunger plates within said frame, yielding bolt and spring connections between said plates and collars, rods fixed to said plates and extending through openings in the bottom of said frame, stripper plate and clearers fixed to the lower ends of said rods, cutters fixed to said frame and interposed between said strippers and clearers, a lower channel plate yieldingly connected to said frame by a bolt and spring connection and normally in contact with the upper surface of said stripper plate, and stops for limiting the downward movement of said channel plate.

3. In a cake cutting machine, a movable cutter carrying frame, cups fixed across the top of said frame, a pair of plunger plates between said frame and cups, rods extending upwardly from said plunger plates and through said cups, a disk at the upper end of each rod, a spring surrounding each rod between the cups and disks, said springs having upward tension for supporting said plunger plates, sets of rods depending from said plunger plates, a stripper plate carried by one set of said rods, clearers carried by the other set of rods, and cutters co-operating with said stripper plates and clearers.

4. In a cake cutting machine, a reciprocating bar, a cutter carrying frame suspended from and raised and lowered by said reciprocating bar, cutters carried by said frame, a spring pressed plate below said frame through which the cutters pass, means for attaching said plate to said frame to provide limited movement of said plate independently of said cutter carrying frame, a pair of plunger plates above said cutter carrying frame secured together in spaced relation, yielding means for supporting said plunger plates from the cutter carrying frame, a plate below said spring pressed plate adapted to strip dough from the exterior of said cutters, means for suspending said stripper plate from said plunger plates, and a plurality of clearers movable interiorly of said cutters also suspended from said plunger plates.

In witness whereof, I have hereunto set my hand and seal at Indianapolis, Indiana, this 17th day of July, A. D. nineteen hundred and nineteen.

CHARLES R. LENTZ. [L. S.]

Witnesses:
E. W. BRADFORD,
M. L. SHULER.